F. DUWE.
HAULING-UP PLANT FOR SHIPS.
APPLICATION FILED MAY 12, 1922.

1,433,706.  
Patented Oct. 31, 1922.

UNITED STATES PATENT OFFICE.

FRIEDRICH DUWE, OF MAINZ, GERMANY, ASSIGNOR TO MASCHINENFABRIK AUGSBURG-NUERNBERG, A.-G., OF NUERNBERG, BAVARIA, GERMANY, A CORPORATION OF GERMANY.

HAULING-UP PLANT FOR SHIPS.

Application filed May 12, 1922. Serial No. 560,385.

*To all whom it may concern:*

Be it known that I, FRIEDRICH DUWE, residing at Leibnitzstrasse No. 32 1/10, Mainz, Germany, have invented certain new and useful Improvements in Hauling-Up Plants for Ships, for which I have filed application No. 72175 in Germany on January 17, 1921, of which the following is a specification.

With hauling-up plants for ships it is often desirable to have a plurality of slips or the like co-operate with but one hauling-up truck or carriage, by means of which a ship carried by it may be transported to any of the slips or the like.

My invention relates to an arrangement or combination of devices which renders it possible to effect that transportation in a particularly advantageous and simple manner. The invention resides in the arrangement of a traverser between the inclined plane forming the hauling up way for the truck or carriage for the ship and the slips or the like, that traverser receiving the truck or carriage with the ship and moving both to any one of the slips or the like.

The hauling-up way has a track upon which the hauling-up carriage may be moved upwards or downwards, as the case may be. A track is provided also upon the hauling-up carriage itself. This latter track carries a set of coupled trucks forming an upper carriage as distinguished from the lower carriage formed by the hauling-up carriage proper, and having stocks for supporting the ship to be transported. Also the traverser has a track upon it, and, finally, each slip, too, is furnished with a track. The tracks of the traverser and slips lie in the same plane, and when the set of trucks running upon the hauling-up carriage is in its uppermost position, also its track lies in the before-mentioned plane.

By this arrangement it is possible to haul the set of trucks carrying the ship upon the tracks of the traverser and from this upon any of the tracks of the slips or the like.

Figure 1:
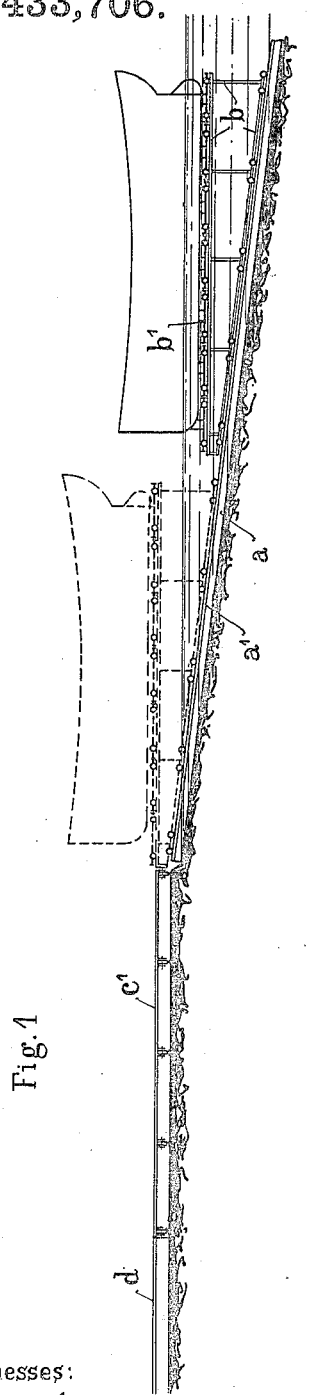
Figure 2:
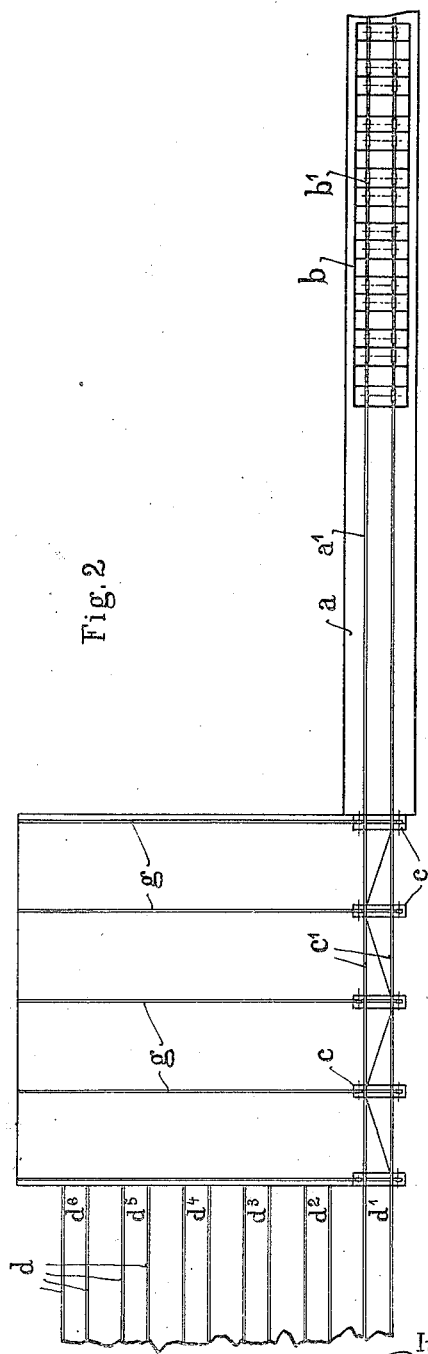

In order to make my invention clearer, I refer to the accompanying drawing, which shows, by way of example, one embodiment. Figure 1 is a side-view of the plant in diagrammatical representation, the lower carriage, the upper carriage, and the ship being shown in full lines in their lowermost position, and in dotted lines in their uppermost position. Figure 2 is a plan of the plant, the dotted lines having been omitted in this figure.

The inclined plane, or hauling-up way $a$ has a track $a^1$ which supports the hauling-up carriage or lower carriage $b$ (Figure 1) which is also furnished with a track. The lower carriage consists of a lower structure inclined in correspondence with the way $a$ and the track $a^1$, and of an upper horizontal structure. The two structures are, of course, rigidly connected with each other. The track of the upper structure of the carriage carries a set of coupled trucks $b^1$ which support the ship in a well known manner, viz, by means of stocks, as usually employed on slips, etc.

At the upper end of the hauling-up way is the traverser $c$ $c^1$ which consists of a plurality of trucks $c$ and of a track $c^1$ connecting them with each other. The traverser may be moved along upon rails $g$ (Fig. 2).

There are, in the example illustrated in Figure 2, six slips (or the like) $d^1$ $d^2$ $d^3$ $d^4$ $d^5$ $d^6$ having each a track $d$. In the example in question the track of the slip $d^1$ is located in the vertical plane of the track $a^1$, but that is of course, not absolutely necessary. At any rate, the track $c^1$ serves as a connecting means between the track $a^1$ and any of the tracks $d$, irrespective of how many tracks $d$ may exist.

Supposing, a ship has been placed upon the track of the upper carriage $b^1$, as illustrated in the right hand portion of Figure 1, and is to be transported, for instance, to the track of the slip $d^4$, then the traverser $c$ $c^1$ is made to join the hauling-up way $a$, after which the lower carriage $b$ with the upper carriage $b^1$ and the ship is hauled up until the track of the upper carriage $b^1$ joins the track of the traverser. Now the upper carriage with the ship is hauled over upon the traverser, and the latter is run to the track of the slip $d^4$, after which the upper carriage $b^1$ is hauled over to this track where the ship is deposited upon stocks in the usual manner. The upper carriage is then returned to the traverser where it may remain for further use.

It is obvious that the transportation of the ship back into the water is effected in the reverse manner.

I claim as my invention:

In a hauling-up plant for ships, the combination, of an inclined hauling-up way, a hauling-up carriage upon said way, an upper carriage upon said hauling-up carriage, a plurality of slips, a traverser arranged between the upper end of the hauling-up way and said slips, and lateral ways arranged transverse relative to the said slips.

In testimony whereof I affix my signature in presence of two witnesses.

FRIEDRICH DUWE.

Witnesses:
FRIEDRICH ANDRAS,
NIKOLAUS BAUER.